L. Brown,
Bee-Hive Appliance.
N° 40,323. Patented Oct. 20, 1863.
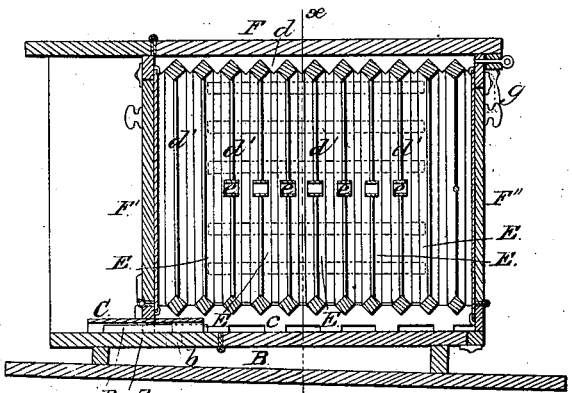
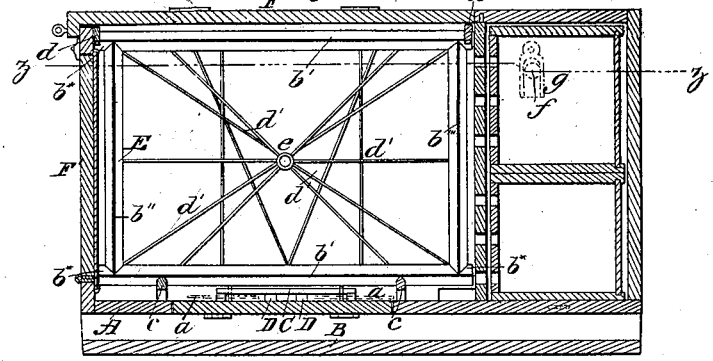
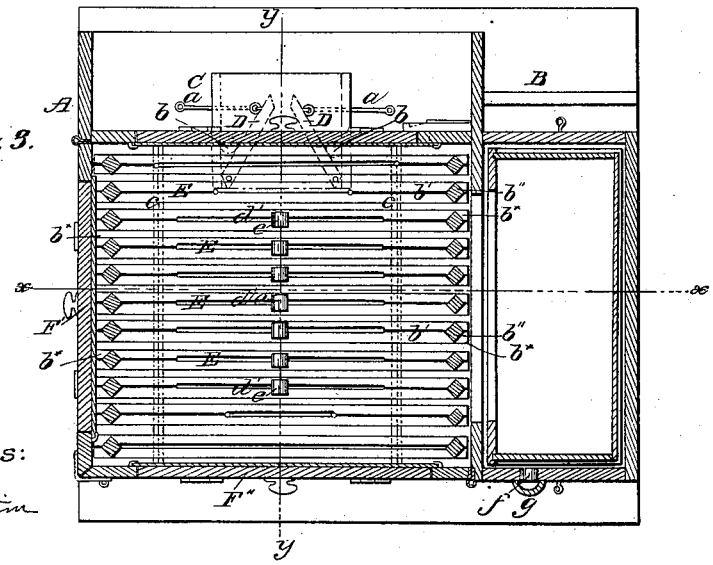
Witnesses:
E. L. Vollentine
Wm. S. Dixon
Inventor
Levi Brown

UNITED STATES PATENT OFFICE.

LEVI BROWN, OF PONTIAC, NEW YORK.

IMPROVEMENT IN BEE-HIVES.

Specification forming part of Letters Patent No. 40,323, dated October 20, 1863.

*To all whom it may concern:*

Be it known that I, LEVI BROWN, of Pontiac, in the county of Erie and State of New York, have invented a new and useful Improvement in Bee-Hives; and I do hereby declare that the following is a full, clear, and exact description of the same, reference being had to the accompanying drawings, forming a part of this specification, in which—

Figure 1 represents a transverse vertical section of my invention, taken in the plane indicated by the line *y y* in Fig. 3. Fig. 2 is a longitudinal vertical section of the same, the plane of section being indicated by the lines *x x* in Figs. 1 and 3. Fig. 3 is a horizontal section of the same, the lines *z z*, Fig. 2, indicating the plane of section.

This invention consists, first, in a certain arrangement of adjustable shutters in the bee-entrance, in combination with holes near the rear ends of said shutters for the purpose of conducting the bee moths or millers which may attempt to enter the hive out at the bottom, and to protect the bees against the robbers; second, in the employment or use of a hollow button or knob to cover the ventilating-opening and shut out the light, leaving at the same time a free passage for the air; third, in a certain construction and arrangement of the movable frames, whereby the ends thereof are kept at a proper distance from the interior of the hive.

To enable those skilled in the art to make and use my invention, I will proceed to describe it.

A represents a bee-hive, made square or oblong, of wood or any other suitable material. It is supported by the bottom board, B, and access is had to its interior through the entrance C. This entrance is provided with two shutters, D, hinged at their inner ends and connected to rods *a*, so that they can be opened or closed at pleasure. In the rear part of the entrance, and close to its sides, are two holes, *b*, passing down through the bottom of the hive. When the shutters are closed or partly closed, leaving room for one bee to pass at a time, the millers or moths will pass into the entrance and come out under the hive instead of into it. The interior of the hive is occupied by a series of movable frames, E, which are made of square pieces of wood turned cornerwise, so that the bees can readily fasten the combs to the centers of the frames. The corners also project out toward the sides and top of the hive, so that if one of the frames should be in close contact with t' e side the bees will not stick the same fast. At the same time it gives the bees more room to pass into the honey-boxes, which may be placed on the side or on the top of the hive.

In order to increase the space between the end frames and sides of the hive, the longitudinal bars *b'* extend over the upright bars *b''*, producing projections *b\**, which prevent the frames coming in close contact with the sides of the hive. The frames are secured in the hive by two notched bars, *c*, fastened to the bottom, and by two other similar notched bars, *d*, fastened to the sides or ends of the hive, as clearly shown in Figs. 1 and 2 of the drawings. Each frame is thus set into two notches below, and it passes under two notches above, one at either end, and by these means they are secured so that they are not liable to tumble out when the hive is turned upside down. In this respect my hive is superior to those in which the frames hang upon rabbets, so that when the hive is moved or turned the frames are liable to fall down into one side of the hive with a perfect destruction to the combs and to the bees.

Each of the movable frames E is provided with a series of guides, *d'*, consisting of wires fastened in the frames crosswise and in different directions, as clearly shown in Fig. 2. These guides prevent the bees from building their combs across two or more frames, and cause them to build the combs straight, and at the same time they afford additional security to the combs. These guides support one or more tubes, *e*, in each frame, or such tube or tubes may be inserted into any other hive with or without movable frames. The object of this tube in the hive is that bees may pass from one frame or comb to another without going round on the outside.

Hives that have slats or movable frames for the bees to make their combs upon are usually straight with no holes through them, and the bees have to be in some five or six separate places, and those bees farthest from the center, or between the outside combs, often freeze to death, and those between the combs, near the middle of the hive, will often starve, as they cannot go round the combs when the weather is very cold. With the tube or tubes *e* the bees can get to any part of the hive or change their position at any time, and they loose less time in going from one comb to another, and consequently they can make more honey than when they have to go round on the outside of the comb.

In order to have perfect control over the interior of the hive, and to be able to move the frames without loss of time, I have made three doors, F F' F'', one in the top and the others in the sides of my hive. Where the hive opens at the top only, it is very difficult to take out the frames. With my hive the frames can be moved for artificial swarming or any other purpose with the greatest ease and convenience.

The hive is ventilated through an opening, *f*, which is covered by a hollow button or knob, *g*, so that by turning said button the light can be shut out without interrupting the current of air in either direction.

For the purpose of facilitating the swarming of the bees, I use a swarming-tube, which extends from the original to the secondary hive. Such a tube prevents the bees from going off. When they are done swarming, they are already hived, and the necessity of running after a swarm, or the danger of loseing the same, is obviated.

The swarming may be facilitated by inserting a window next the secondary hive into the swarming-tube to cause the bees in seeking the light to enter from the original into the secondary hive.

Some of the advantages due to certain features of my invention may be separately enumerated, as follows:

First, by reason of the use of my shutters D D, inclining toward each other, as represented, and adapted to guide the moths away from the true entrance of the hive, arranged also so as to conduct the said enemies to the holes *b b*, I am able, when circumstances render it desirable, to so adjust the parts that only the bees themselves are able to find the true entrance with facility, while all strangers and less intelligent insects mistake the path. By this I greatly retard the entrance of enemies and increase the chances of their eventual exclusion or destruction.

Second, by reason of the absence in the hollow button B of any grated or other aperture for the admission of light other than that which may enter through the tortuous passage provided for the air, I am able to allow a sufficiently free passage for air and still keep the interior of the hive dark.

Third, by reason of my overhanging ends $b^*$ of the longitudinal bars $b'$ of the frames E, arranged as represented relatively to the notched bars *c* and *d*, mounted at the top and bottom of the interior of the hive, I provide with inconsiderable expense for a very reliable and firm support of the frame E at a proper distance each from the other and from the sides of the hive, and also insure a suitable space between the ends of the said frames and the adjacent parts of the interior of the hive.

What I claim as new, and desire to secure by Letters Patent, is—

1. The arrangement of adjustable shutters D in the bee-entrance C, in combination with the holes *b*, substantially as and for the purpose specified.

2. The hollow opaque button *g*, in combination with the ventilating-opening *f*, substantially as set forth.

3. The overhanging parts or extensions $b^*$ of the top and bottom parts of the frames, arranged relatively to the notched bars and to the sides of the hive, substantially as and for the purpose herein set forth.

LEVI BROWN.

Witnesses:
E. L. VALLENTINE,
WM. S. SISSON.